United States Patent [19]

Tamura et al.

[11] 4,196,701
[45] Apr. 8, 1980

[54] INTERNAL COMBUSTION ENGINE INTAKE SYSTEM HAVING AUXILIARY PASSAGE BYPASSING MAIN THROTTLE TO PRODUCE SWIRL IN INTAKE PORT

[75] Inventors: Masayuki Tamura; Kazuya Kunii, both of Yokohama, Japan

[73] Assignee: Nissan Motor Company, Limited, Yokohama, Japan

[21] Appl. No.: 865,312

[22] Filed: Dec. 28, 1977

[30] Foreign Application Priority Data

Dec. 28, 1976 [JP] Japan .............................. 51-160334

[51] Int. Cl.² .............................................. F02B 15/00
[52] U.S. Cl. .................................. 123/30 C; 123/75 B; 123/188 AF; 123/188 M
[58] Field of Search .............. 123/75 B, 30 C, 188 M, 123/188 AF, 188 VA, 141, 119 D, 124 R, 32 ST, 26

[56] References Cited

U.S. PATENT DOCUMENTS

| | | | |
|---|---|---|---|
| 3,359,958 | 12/1967 | von Seggern et al. | 123/75 B |
| 3,364,911 | 1/1968 | Baudry et al. | 123/188 AF |
| 3,408,992 | 11/1968 | von Seggern et al. | 123/75 B |
| 3,678,905 | 7/1972 | Diehl | 123/75 B |
| 3,976,039 | 8/1976 | Henault | 123/119 D |
| 3,980,059 | 9/1976 | Noguchi et al. | 123/32ST |
| 4,018,193 | 4/1977 | Klomp | 123/30 C |
| 4,104,989 | 8/1978 | Resler, Jr. | 123/75 B |
| 4,119,064 | 10/1978 | Klomp | 123/30 C |

FOREIGN PATENT DOCUMENTS 2514416 10/1976 Fed. Rep. of Germany ...... 123/124 R

*Primary Examiner*—Charles J. Myhre
*Assistant Examiner*—Andrew M. Dolinar

[57] ABSTRACT

An auxiliary passage of a relatively small cross-sectional area bypasses the main throttle valve of a usual induction passage to extend to each intake port. The auxiliary passage allows air or an air-fuel mixture to pass therethrough according to the magnitude of vacuum in the intake port and, in its endmost portion, takes the form of a nozzle directioned circumferentially of the intake port, so that the air-fuel mixture flowing in the intake port is agitated to thorough homogenization by a swirling movement of the injected gas particularly efficiently during low load operation of the engine.

14 Claims, 8 Drawing Figures

INTERNAL COMBUSTION ENGINE INTAKE SYSTEM HAVING AUXILIARY PASSAGE BYPASSING MAIN THROTTLE TO PRODUCE SWIRL IN INTAKE PORT

BACKGROUND OF THE INVENTION

This invention relates to an intake system of an internal combustion engine, and more particularly to an improvement on an induction passage for achieving agitation and a thorough homogenization of an air-fuel mixture in an intake port.

For internal combustion engines, it has been considered and in some cases put into practice to promote homogenization of an air-fuel mixture admitted into the engine by producing a turbulent flow of the mixture upon its entrance into the combustion chambers thereby to attain an improved combustion characteristic through an increased burning rate. This is particularly effective for maintaining a stable engine operation under low load conditions including idling.

Methods proposed hitherto to accomplish this object include, for example, constricting an induction passage in a portion near the combustion chambers to accelerate an air-fuel mixture flow, lessening the lift of intake valves instead of constricting the induction passage, and providing a particularly shaped shroud to each intake valve so as to forcibly vary the direction of the flow of the admitted air-fuel mixture, for example, to a direction circumferentially of the combustion chamber.

A disadvantage common to these prior art methods is that the employment of a flow-stimulating means as mentioned above becomes a significantly great intake resistance during full-throttle operation of the engine and hence causes lowering of the charging efficiency and maximum power of the engine.

SUMMARY OF THE INVENTION

It is an object of the invention to provide an improved intake system of an internal combustion engine, which intake system can agitate an air-fuel mixture to a thorough homogenization just before its admission into a combustion chamber at a particularly high efficiency during low load operation of the engine, without exhibiting an appreciable intake resistance under high load operating conditions or causing the maximum power of the engine to lower.

It is another object of the invention to provide an improved intake system of an internal combustion engine, which system causes an air-fuel mixture to make a swirling movement in each intake port at each intake stroke with enhancing vigor as the magnitude of intake vacuum becomes greater.

An intake system according to the invention has an induction passage, means for introducing fuel into the induction passage, a main throttle valve, an intake valve and an intake port as an endmost portion of the induction passage adjoining a combustion chamber, with the interposition of the intake valve, all arranged in the usual manner. The fuel introducing means may be either a carburetor or a fuel injection system. As a novel feature, this intake system comprises an auxiliary induction passage which has a smaller cross-sectional area than the aforementioned induction passage or main induction passage and is arranged to bypass the main throttle valve and extend to the intake port. An endmost portion of this passage takes the form of a nozzle which opens into the intake port in a direction generally circumferentially of the intake port.

At the other end, the auxiliary induction passage makes a free communication with the atmosphere or alternatively branches from the main induction passage at a section upstream of the main throttle valve where flows an air-fuel mixture. Accordingly either air or the air-fuel mixture passes through the auxiliary passage and is injected into the intake port as a high velocity swirl at each intake stroke due to vacuum in the intake port, causing that the air-fuel mixture supplied through the main induction passage is vigorously agitated in a swirling manner to reach a thorough homogenization within the intake port. Since the air-fuel mixture enters the combustion chamber in this state, quick burning and hence a complete combustion can be realized even when the engine is idling or operating under a low load condition.

As the essential advantage of an intake system according to the invention, the injection of air or air-fuel mixture into the intake port through the auxiliary passage naturally weakens and diminishes as the magnitude of vacuum in the intake port decreases, that is, as the load on the engine increases. The auxiliary passage, therefore, fully fulfils its function during low load operation of the engine but does not offer an appreciable resistance to an air-fuel flow through the main induction passage in medium to high load regions of the engine operating condition.

As optional modifications, the auxiliary passage may be equipped with a throttle valve when the air-fuel mixture passes therethrough and/or a stop valve which opens only at each intake stroke of the engine.

DESCRIPTION OF PREFERRED EMBODIMENTS

Figure 1:
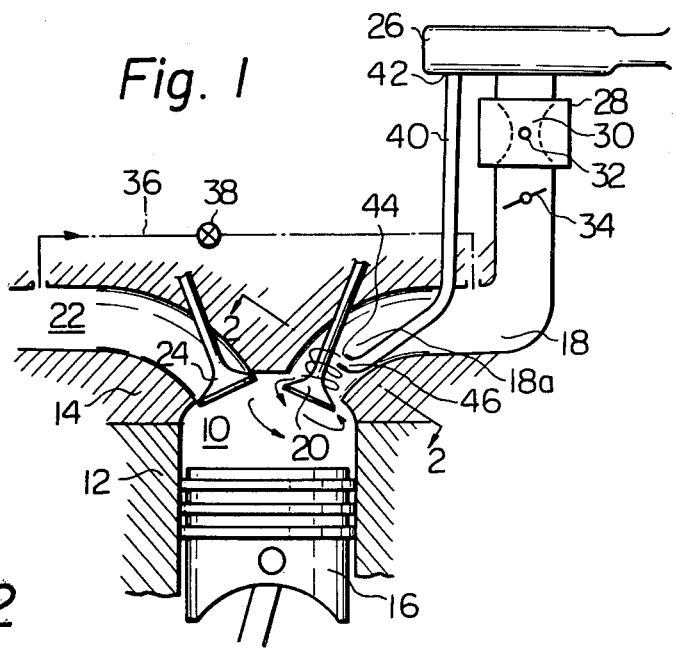
FIG. 1 is a schematic and sectional view of an internal combustion engine intake system as an embodiment of the invention.

FIG. 1 shows a case where the invention is applied to an internal combustion engine which is equipped with a conventional carburetor. A combustion chamber 10 is defined in an assembly of a cylinder block 12 and a cylinder head 14 as a space above a reciprocating piston 16. (A spark plug for the combustion chamber 10 is omitted from illustration for simplicity.) An induction passage 18, an intake valve 20, an exhaust passage 22 and an exhaust valve 24 are provided to this combustion chamber 10 in the usual manner. An end portion close to the intake valve 20 of the induction passage 18 will be referred to as an intake port 18a. In other words, the intake port 18a is a gas passage provided within the cylinder head 14 to serve as an end portion of the induction passage. At the other end the induction passage 18 is connected to an air cleaner 26. An intermediate section of the induction passage 18 constitutes a venturi section 30 of a carburetor 28, and a fuel nozzle 32 opens into this section 30. A main throttle valve 34 is located downstream of the venturi section 30. As a measure for suppression of NOx formation in the combustion chamber 10, the induction passage 18 may be interconnected with the exhaust passage 22 by an exhaust gas recirculation passage 36 with the provision of a flow control valve 38 to recirculate a portion of the exhaust gas back into the combustion chamber 10. In these respects the illustrated intake system is of a known construction.

Figure 2:
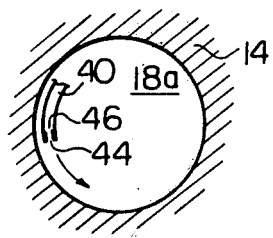
FIG. 2 is a cross-sectional view taken along the line 2—2 of FIG. 1.

As a novel feature of this intake system, an auxiliary air passage 40, which is far smaller in cross-sectional area than the induction passage 18, connects the air cleaner 26 with the intake port 18a so as to bypass the throttle valve 34. In this case this passage 40 (will be referred to simply as the bypass) takes the form of a conduit with its one end portion on the downstream side extending in the intake port 18a. One end 42 of this conduit 40 opening into the air cleaner 26 will be referred to as the entrance and another open end 44 which is located in the intake port 18a as the exit. An endmost portion of the conduit 40 has a reduced cross-sectional area section or orifice 46 near the exit 44 and is directioned such that air flows out through the exit 44 generally circumferentially or tangentially of the intake port 18a, which is usually circular in cross section, as shown in FIG. 2.

During each intake stroke of the piston 16, the pressure in the intake port 18a where is located the exit 44 of the bypass 40 is below the pressure at the entrance 42 in the air cleaner 26 (or a section of the induction passage 18 upstream of the venturi section 30). Accordingly air flows through the bypass 40 and is ejected through the exit 44 with a considerably high velocity. Since the endmost portion of the conduit 40 extending in the intake port 18a is directioned as shown in FIG. 2, the air is introduced into the air-fuel mixture flowing in the intake port 18a in a swirling manner with the result that the air-fuel mixture is agitated vigorously. As a consequence the air-fuel mixture is thoroughly homogenized during its passage through the intake port 18a, and hence a subsequent combustion in the chamber 10 can be accomplished quickly and completely without leaving an appreciable amount of the mixture unburned.

The injection of air into the intake port 18a through the bypass 40 during each intake stroke causes that the air-fuel mixture in the intake port 18a has a swirling tendency even after the closing of the intake valve 20. Accordingly the air-fuel mixture soon makes a swirling movement at the start of a next intake stroke and flows into the combustion chamber 10 very rapidly with minimized obstruction by the intake valve 20. This manner of admission of the mixture into the combustion chamber 10 leads to the realization of turbulence with a swirling component in the combustion chamber 10.

The pressure in the intake port 18a during an intake stroke will be represented by $P_1$ ($P_1$ is nearly equal to the pressure in the combustion chamber 10 during this stroke), and the pressures at the same moment in the induction passage 18 by $P_2$ for a section between the throttle valve 34 and the venturi section 30 and $P_3$ for a section upstream of the venturi section 30. The pressure at the entrance 42 of the bypass 40 is represented by $P_4$, but there holds the relation that $P_4$ is approximately equal to $P_3$ and higher than $P_2$ due to a flow constriction at the venturi section 30. Accordingly the pressure difference ($P_4 - P_1$) is far greater than the difference ($P_2 - P_1$), so that a high velocity flow of air through the bypass 40 is realized surely. The cross-sectional area of the orifice 46 is determined so as to attain a sufficiently high velocity of the ejected air by utilizing the pressure difference ($P_4 - P_1$) most effectively.

The exit 44 of the bypass 40 is preferably located close to the wall of intake port 18a because then a portion of the fuel flowing as a substantially liquid film along the wall face can be effectively separated from the wall face by the injected air and well mixed with the remaining portion which has been atomized or vaporized and mixed with air. A sufficient homogenization of the air-fuel mixture and a resultant complete combustion can be achieved even when the exit 44 is a little distant from the intake valve 20 such that the continuance of a swirling tendency in the combustion chamber 10 is not assured. However, it is preferable that the exit 44 is located close to the valve seat of the intake valve 20, because then turbulence of the air-fuel mixture as the development of a swirling tendency afforded by the circumferentially directed injection of the air will remain even after the admission of the mixture into the combustion chamber 10.

When the induction passage 18 is about 40 mm in diameter downstream of the venturi section 30, the orifice 46 in the bypass 40 will be made, for example, about 1.5 mm in diameter.

In general it becomes difficult to achieve a complete combustion of the air-fuel mixture in the combustion chamber 10 during idling or low load operation of the engine. As a matter of advantage, the velocity of the air flow through the bypass 40 increases under these operating conditions with the result that the homogenizing effect of the air injection on the air-fuel mixture in the intake port 18a is enhanced because the aforementioned pressure difference ($P_4 - P_1$) becomes greater under these conditions. From the same reason, there occurs natural decrease in the velocity of the air flow through the bypass 40 and hence the quantity of air admitted through the bypass 40 while the engine operates with good stability under medium to high load conditions.

The carburetor 28 in FIG. 1 is adjusted, taking into account the addition of air through the bypass 40, so as to deviate the air/fuel ratio from an optimum ratio for operation of the engine slightly to the richer side.

Figure 3:
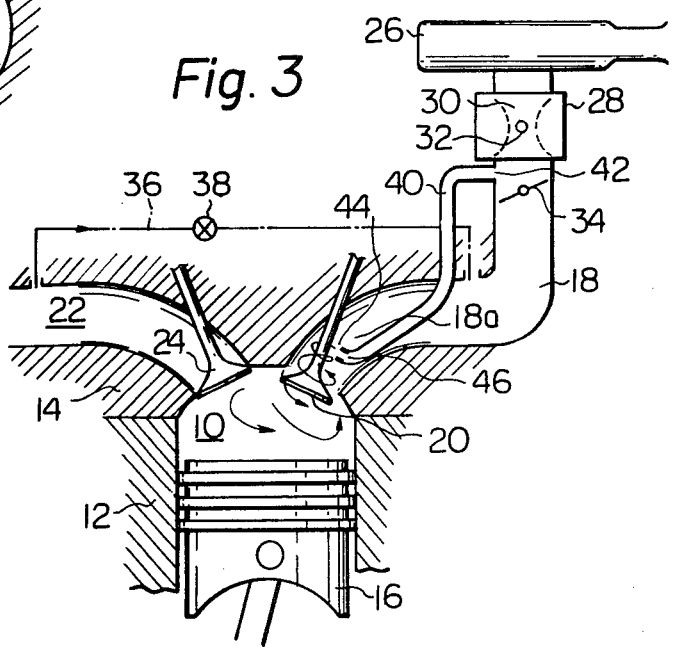
FIGS. 3 and 4 show slight modifications of the intake system of FIG. 1 in two different ways, respectively.

FIG. 3 shows fundamentally the same intake system as that of FIG. 1. As a sole difference, the bypass 40 in the system of FIG. 3 does not start at the air cleaner 26 but branches from the induction passage 18 at an intermediate section downstream of the venturi section 30 but upstream of the throttle valve 34. As the result, a portion of the air-fuel mixture passes through the bypass 40 instead of air in the case of FIG. 1. It will be apparent that a high velocity swirl of the air-fuel mixture ejected from the exit 44 in the intake port 18a exhibits the same effect as the swirling air in FIG. 1 on the agitation or thorough mixing of air-fuel mixture. In this case the flow of the air-fuel mixture through the bypass 40 is caused by the pressure difference ($P_2 - P_1$) which is smaller than ($P_4 - P_1$) utilized in the case of FIG. 1, so that the air-fuel mixture is injected with a lower velocity than the air injected in FIG. 1 under the same condition. However, the method shown in FIG. 3 has the advantage that a sufficient agitation of the air-fuel mixture in the intake port 18a is realized with no influence on the air/fuel ratio, meaning that the adjustment of the carburetor 28 needs no special consideration. Besides, it is possible to design the intake system such that during idling of the engine the entire quantity of the air-fuel mixture for operation of the engine is supplied through the bypass 40. During normal operation of the engine, neither the driveability nor fuel economy is influenced by such design since the amount of the mixture passed through the bypass 40 decreases as the load increases.

Figure 4:
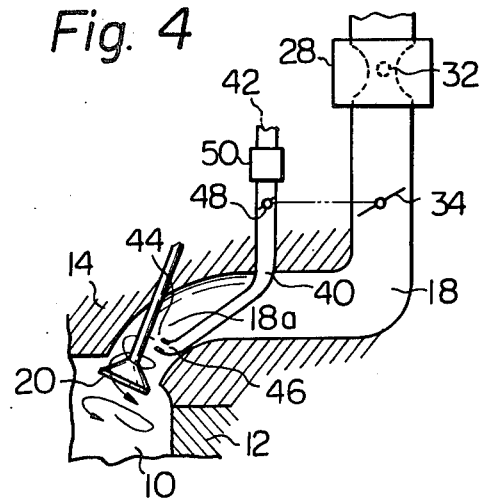

Referring to FIG. 4, the bypass 40 may optionally be provided with a throttle valve 48 to control the magnitude of difference of the pressure at the exit 44 from the pressure at the entrance 42. In this case it is preferable that this throttle valve 48 is mechanically linked with the main throttle valve 34 in the induction passage 18 so as to be moved according to the engine operating condition. This method is applicable to both the system of FIG. 1 and that of FIG. 3. When it is intended to pass the air-fuel mixture through the bypass 40 in FIG. 4, the bypass 40 may be arranged to admit air through its entrance 42 with the provision of a fuel introducing means 50 at a section upstream of the throttle valve 48. However, the provision of the throttle valve 48 is not an indispensable requisite to the fuel introducing means 50, but it is possible to omit the throttle valve 48 thereby leaving the flow rate of the air-fuel mixture through the bypass 40 to a natural regulation by the pressure difference $(P_4-P_1)$ and the crosssectional area of the orifice 46. In such a case the cross-sectional area of the orifice 46 is preferably made such that during idling of the engine the air-fuel mixture is passed to the intake port 18a exclusively through the bypass 40, while the main throttle valve 34 is closed completely. For example, the orifice 46 will be made about 2 mm in diameter when the induction passage 18 is about 40 mm in diameter.

Figure 5:
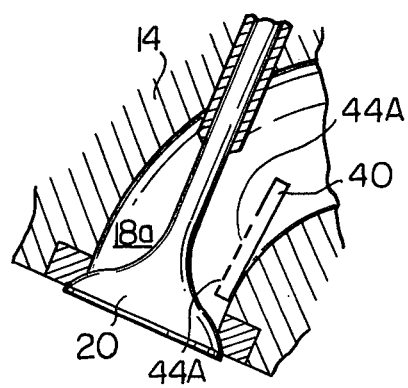
FIG. 5 is a fragmentary and sectional view of an air duct used as an element of an intake system according to the invention.

In any of the illustrated embodiments, the exit 44 of the bypass or conduit 40 may be modified as shown in FIG. 5. In the foregoing description an open end of the conduit 40 has served as the exit 44, but in FIG. 5 the conduit 40 is closed at its end in the intake port 18a and instead has a plurality of radial holes 44A bored through its side wall in the endmost portion disposed in the intake port 18a. The use of these radial holes 44A as the exit of the conduit 40 has the advantage that both the effective area and the direction of the exit can be made as desired with more ease. It is permissible to form only one radial hole 44A in the side wall of the conduit 40 as its exit, but it is preferable to form a plurality of radial holes 44A with short intervals in the axial direction of the endmost portion of the conduit 40 because then the aforementioned thin liquid fuel layer can be separated from the wall face of the intake port 18a by the injected air (or air-fuel mixture) at several locations, meaning the promotion of thorough homogenization of the air-fuel mixture.

Figure 6:
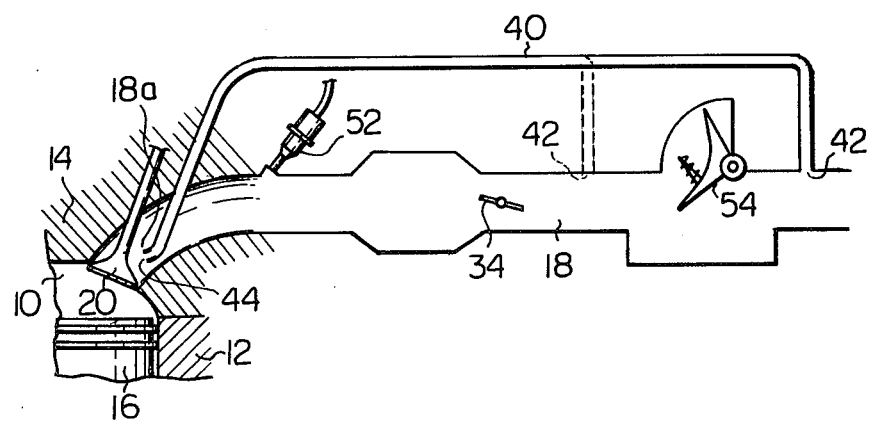
FIGS. 6 and 7 are schematic and sectional views of still differently constructed intake systems also as embodiments of the invention.

FIG. 6 shows the application of the invention to an intake system which includes an electronic fuel injection system instead of a carburetor. In this case a fuel injector 52 opens into the induction passage 18 at a section downstream of the throttle valve 34, and an aeroflow meter 54 of a potentiometer type is disposed in the induction passage 18 upstream of the throttle valve 34. The bypass 40 is arranged substantially in the same manner as in the case of FIG. 1 so as to inject air into an air-fuel mixture in the intake port 18a. Since the flow meter 54 gives a certain resistance to the flow of air through the induction passage 18, the air injection is accomplished with greatest vigor by positioning the entrance 42 of the bypass 40 upstream of the flow meter 54. In this case the fuel injection system should be controlled so as to increase the fuel injection rate with consideration of the quantity of air admitted through the bypass 40. However, the entrance 42 may be positioned between the flow meter 54 and the throttle valve 34 as illustrated in broken line in FIG. 6 with an advantage that the provision of the bypass 40 has no influence on the accuracy of the fuel injection rate or the resultant air/fuel ratio since no quantity of air bypasses the flow meter 54. Of course the exit 44 of the conduit 40 in FIG. 6 may optionally be made as described hereinbefore with reference to FIG. 5.

It is preferable that the introduction of air or air-fuel mixture into the intake port 18a through the bypass 40 does not occur while the intake valve 20 remains closed. From this viewpoint, the bypass 40 may be equipped with a stop valve which opens simultaneously with the intake valve 20.

Figure 7:
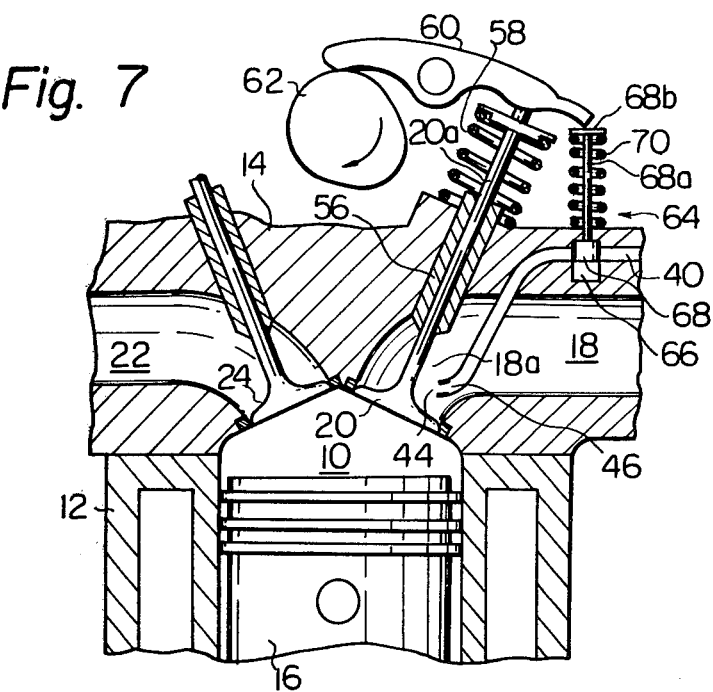

Referring to FIG. 7, the stem 20a of the intake valve 20 extends through a valve guide 56 embedded in the cylinder head 14 to a rocker arm 60, which is in contact with the surface of a cam 62 in the usual manner, with the support of a spring 58. A stop valve 64 is provided to the bypass 40 in the following manner. A portion of the bypass 40 is made to pass through the cylinder head 14 in a region close to the valve guide 56, and a recess 66 is formed in the cylinder head 14 so as to cross the bypass 40. A valve member 68 is received in this recess 66 so as to make a sliding movement therein crosswise to the bypass 40 and has a stem 68a extending towards the rocker arm 60. A spring 70 keeps the extended end 68b of the stem 68a always in contact with the rocker arm 60 so that the valve member 66 may move in synchronism with the intake valve 20. The stop valve 64 is designed such that the valve member 68 blocks the bypass 40 completely except at each intake stroke of the piston 16.

Figure 8:
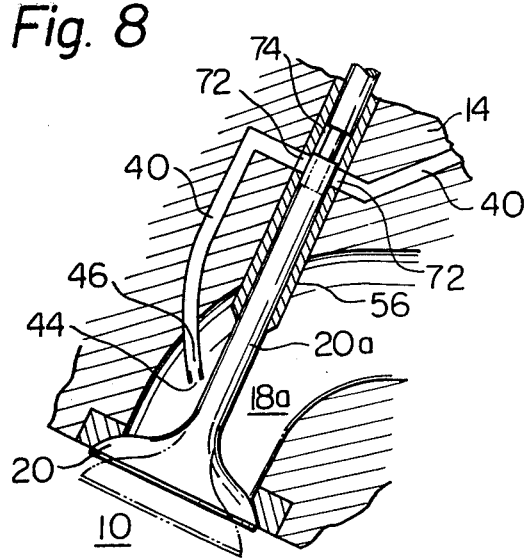
FIG. 8 shows a modification of the intake system of FIG. 7.

FIG. 8 shows a different method of providing a stop valve means to the bypass 40. In this case a portion of the bypass 40 is formed in the cylinder head 14 to cross the valve guide 56. This means that the valve guide 56 has two radial holes 72 with a common axis in a cross-sectional plane (with respect to the cylindrical guide 56). The stem 20a of the intake valve 20 is locally reduced in diameter so as to form an annular groove 74 around the stem 20a in a region which becomes radially or laterally in alignment with the holes 72 of the valve guide 56 when the intake valve 20 is opened. Accordingly the valve stem 20a blocks the bypass 40 while the valve 20 is closed, but when the valve 20 is opened the holes 72 and the annular groove 74 serve as part of the bypass 40, allowing the passage of air or air-fuel mixture therethrough.

Other than a great contribution to a stable and complete combustion particularly under low load conditions, the injection of air or air-fuel mixture into the intake port 18a through the bypass 40 offers the following advantages to the engine.

It is possible to diminish the scale of spark advance, for example by about 10 degrees in terms of the crank angle by our experiment, because of a quickened burning of the homogenized mixture under idling condition. Accordingly it becomes easier to employ a lean mixture which is favorable to both the emission control and fuel economy.

When the recirculation of the exhaust gas is effected as illustrated in FIGS. 1 and 3, it is possible to recirculate an increased amount of exhaust gas without losing stability of the engine operation due to an increased burning rate. Of course this leads to an enhanced suppression of NOx formation.

For a multi-cylinder engine, it is possible to operate the engine as a so-called "rich-lean" engine by fundamentally supplying a rich mixture to the engine and effecting the injection of air through the bypass 40 only for a portion of the engine cylinders. Also in this case, a good combustibility attributable to the air injection is realized for the cylinders operated with the diluted or lean mixture.

What is claimed is:

1. In an intake system of an internal combustion engine, having an induction passage, an intake port as an endmost portion of the induction passage adjoining a combustion chamber of the engine, a main throttle valve installed in the induction passage upstream of said intake port, an intake valve for periodically providing communication of the intake port with the combustion chamber according to the engine cycle, and means for introducing fuel into the induction passage through a fuel nozzle opening into the induction passage at a section upstream of the intake port, the improvement comprising an auxiliary induction passage which has a smaller cross-sectional area than said induction passage and is arranged to bypass said main throttle valve and extend to said intake port, an endmost portion of said auxiliary induction passage taking the form of a conduit which extends in said intake port such generally circumferentially of said intake port and has an open end so shaped as to constitute a nozzle opening into said intake port in a direction generally circumferentially of said intake port such that a gas injected from said nozzle makes a swirling flow in said intake port.

2. An intake system as claimed in claim 1, wherein said auxiliary induction passage freely communicates with the atmosphere at one end thereof on the upstream side, so that air passes through said auxiliary induction passage.

3. An intake system as claimed in claim 2, further comprising means for introducing said fuel into said auxiliary induction passage at an intermediate section thereof, so that an air-fuel mixture is introduced into said intake port through said auxiliary induction passage.

4. An intake system as claimed in claim 3, further comprising an auxiliary throttle valve installed in said auxiliary induction passage upstream of said endmost portion at a section where said air-fuel mixture flows, said auxiliary throttle valve being linked with said main throttle valve such that the opening degree thereof varies according to an operating condition of the engine.

5. An intake system as claimed in claim 1, wherein said auxiliary induction passage at one end thereof branches from said induction passage at a section downstream of said fuel nozzle, so that an air-fuel mixture passes through said auxiliary induction passage.

6. An intake system as claimed in claim 1, wherein said means comprise a carburetor arranged such that said fuel nozzle is located in a venturi section formed upstream of said main throttle valve.

7. An intake system as claimed in claim 6, wherein said auxiliary induction passage freely communicates with the atmosphere at one end thereof, bypassing said venturi section.

8. An intake system as claimed in claim 6, wherein said auxiliary induction passage at one end thereof branches from said induction passage at a section between said fuel nozzle and said main throttle valve.

9. An intake system as claimed in claim 1, wherein said means comprise a fuel injection system arranged such that said fuel nozzle is located at a section downstream of said main throttle valve.

10. An intake system as claimed in claim 9, wherein said auxiliary induction passage freely communicates with the atmosphere at one end thereof, said fuel injection system comprising a flow meter for detecting the flow rate of air in said induction passage at a section upstream of said main throttle valve.

11. An intake system as claimed in claim 9, wherein said fuel injection system comprises a flow meter for detecting the flow rate of air in said induction passage at a section upstream of said main throttle valve, said auxiliary induction passage at one end thereof branches from said induction passage at a section between said flowmeter and said main throttle valve.

12. An intake system as claimed in claim 1, further comprising a stop valve means for normally blocking said auxiliary induction passage at a section upstream of said endmost portion and opening said auxiliary induction passage only while said intake valve remains open.

13. An intake system as claimed in claim 12, wherein said stop valve means comprise a valve member which has a valve stem and is movable crosswise to said auxiliary induction passage, said valve stem being associated with a valve train for operating said intake valve.

14. An intake system as claimed in claim 12, wherein said intake valve has a valve stem which passes slidably through a cylindrical valve guide embedded in a cylinder head of the engine, two radial holes being bored through the side wall of said valve guide with a common axis normal to the longitudinal axis of said valve guide, said auxiliary induction passage being arranged so as to cross said valve stem at the bored section, a portion of said valve stem, which portion becomes radially in alignment with said two holes when said intake valve is opened, being reduced in diameter such that the bored section of said valve guide is blocked by said valve stem while said intake valve remains closed and that the bored section of said valve guide is effective as part of said auxiliary induction passage while said intake valve remains open and said portion of said valve stem remains radially in alignment with said two holes.

* * * * *